(12) United States Patent
Nellen

(10) Patent No.: US 9,969,245 B2
(45) Date of Patent: May 15, 2018

(54) SLIDING SUPPORT ARRANGEMENT AND ROOF ASSEMBLY FOR A VEHICLE

(71) Applicant: Inalfa Roof Systems Group B.V., Oostrum (NL)

(72) Inventor: Marcel Johan Christiaan Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days. days.

(21) Appl. No.: 15/462,107

(22) Filed: Mar. 17, 2017

(65) Prior Publication Data

US 2017/0267075 A1 Sep. 21, 2017

(30) Foreign Application Priority Data

Mar. 21, 2016 (EP) ..................................... 16161446

(51) Int. Cl.
*B60J 7/02* (2006.01)
(52) U.S. Cl.
CPC ...... *B60J 7/022* (2013.01); *B60J 7/02* (2013.01)
(58) Field of Classification Search
CPC .................................. B60J 7/02; B60J 7/022
USPC ...................................... 296/216.01–224, 214
See application file for complete search history.

(56) References Cited

U.S. PATENT DOCUMENTS

| | | | |
|---|---|---|---|
| 1,370,500 A | 3/1921 | Jones | |
| 1,459,155 A | 6/1923 | Ioor | |
| 1,673,326 A | 6/1928 | Goldsmith | |
| 3,017,927 A | 1/1962 | Demko | |
| 3,558,183 A | 1/1971 | Sigmund | |
| 3,671,997 A * | 6/1972 | Sigmund | B60J 7/02 16/93 R |
| 4,649,981 A | 3/1987 | Bibeau | |
| 4,650,243 A | 3/1987 | Hanley | |
| 4,679,846 A | 7/1987 | Lux | |
| 4,699,421 A | 10/1987 | Schaetzler | |
| 4,741,573 A | 5/1988 | Yokota | |

(Continued)

FOREIGN PATENT DOCUMENTS

| | | |
|---|---|---|
| CN | 2700152 Y | 5/2005 |
| CN | 1721216 A | 1/2006 |

(Continued)

OTHER PUBLICATIONS

European Search Report and Written Opinion for European patent application No. 16161446.6, dated Sep. 23, 2016.

*Primary Examiner* — Dennis H Pedder
(74) *Attorney, Agent, or Firm* — Steven M. Koehler; Westman, Champlin & Koehler, P.A.

(57) ABSTRACT

A sliding support arrangement for supporting a slidable element in a closure of a roof assembly for a vehicle with respect to mutually orthogonal X, Y and Z directions, comprising at least a guide rail extending substantially in the X-direction. The slidable element carries a slide shoe engaging the guide rail and supporting the slidable element at least in the Z-direction. The slide shoe includes a first part fixed to the slidable element and a relatively movable second part. The second part is supported by the first part mainly through a spring urging the slide shoe parts in engagement with walls of the guide rail. The spring exerts a force which is directed at a non-perpendicular angle to at least one wall of the guide rail.

19 Claims, 6 Drawing Sheets

(56) References Cited

U.S. PATENT DOCUMENTS

| | | |
|---|---|---|
| 4,890,880 A | 1/1990 | Sakamoto |
| 4,923,246 A | 5/1990 | Takahashi |
| 4,936,623 A | 6/1990 | Huyer |
| 4,978,165 A | 12/1990 | Schreiter |
| 4,995,665 A | 2/1991 | Ichinose |
| 5,026,113 A | 6/1991 | DiCarlo |
| 5,117,892 A | 6/1992 | Murray |
| 5,447,355 A | 9/1995 | Kelm |
| 5,464,267 A | 11/1995 | Racine |
| 5,707,102 A | 1/1998 | Takahashi |
| 5,906,412 A | 5/1999 | Matsumura |
| 5,934,353 A | 8/1999 | Buhr |
| 6,179,373 B1 | 1/2001 | Bohm |
| 6,364,406 B1 | 4/2002 | Leonardus et al. |
| 6,394,173 B2 | 5/2002 | Enssle |
| 6,416,122 B1 | 7/2002 | Schwarz |
| 6,652,022 B2 | 11/2003 | Pfalzgraf |
| 6,805,402 B2 | 10/2004 | Pfalzgraf |
| 6,923,500 B2 * | 8/2005 | Ito .................. B60J 7/003 296/214 |
| 6,942,003 B2 | 9/2005 | Thompson |
| 7,114,766 B2 | 10/2006 | Becher |
| 7,114,767 B2 | 10/2006 | Grimm |
| 7,178,862 B2 | 2/2007 | Oechel |
| 7,793,702 B2 | 9/2010 | Biewer |
| 7,828,376 B2 | 11/2010 | Nellen |
| 7,971,626 B2 | 7/2011 | Renz |
| 8,870,276 B2 | 10/2014 | Geurts |
| 9,090,147 B2 | 7/2015 | Nellen |
| 2002/0041115 A1 | 4/2002 | Johannes |
| 2002/0145310 A1 | 10/2002 | Pfalzgraf |
| 2002/0163227 A1 | 11/2002 | Pfalzgraf |
| 2005/0225122 A1 | 10/2005 | Grimm |
| 2005/0225123 A1 | 10/2005 | Grimm |
| 2005/0231007 A1 | 10/2005 | Oechel |
| 2006/0027347 A1 | 2/2006 | Boehm |
| 2007/0175603 A1 | 8/2007 | Lin |
| 2008/0179021 A1 | 7/2008 | Biewer |
| 2009/0033113 A1 | 2/2009 | Albert |
| 2009/0145559 A1 | 6/2009 | Glasl |
| 2009/0178771 A1 | 7/2009 | Lin |
| 2009/0179462 A1 | 7/2009 | Nellen |
| 2011/0146921 A1 | 6/2011 | Nellen |
| 2011/0227371 A1 | 9/2011 | Nellen |

FOREIGN PATENT DOCUMENTS

| | | |
|---|---|---|
| DE | 2234852 A1 | 1/1974 |
| DE | 3802380 A1 | 8/1988 |
| DE | 9302762 U1 | 4/1993 |
| DE | 19713347 C1 | 5/1999 |
| DE | 103448545 | 5/2005 |
| DE | 102004018461 A1 | 11/2005 |
| DE | 10200402882 A1 | 1/2006 |
| DE | 102005007031 A1 | 8/2006 |
| DE | 202006015107 U1 | 1/2007 |
| DE | 202007005531 U1 | 6/2007 |
| EP | 0338614 A1 | 10/1989 |
| EP | 0381066 A2 | 8/1990 |
| EP | 0802077 A1 | 10/1997 |
| EP | 1195281 A1 | 4/2002 |
| EP | 1588880 A2 | 10/2005 |
| EP | 1616737 A1 | 1/2006 |
| EP | 1902880 A1 | 3/2008 |
| EP | 1953018 A1 | 8/2008 |
| EP | 2078630 A1 | 7/2009 |
| EP | 2008100338.6 A1 | 7/2009 |
| FR | 1378077 A | 11/1964 |
| FR | 2726512 A1 | 5/1996 |
| FR | 2878889 A1 | 6/2006 |
| JP | 38126 A | 3/1984 |
| JP | 246824 A | 10/1990 |
| KR | 92-008091 | 9/1992 |
| NL | 1014023 C2 | 7/2001 |
| WO | 2006053520 A2 | 5/2006 |
| WO | 2006086955 A1 | 8/2006 |
| WO | 2007079747 A1 | 7/2007 |
| WO | 2010063312 A1 | 6/2010 |

* cited by examiner

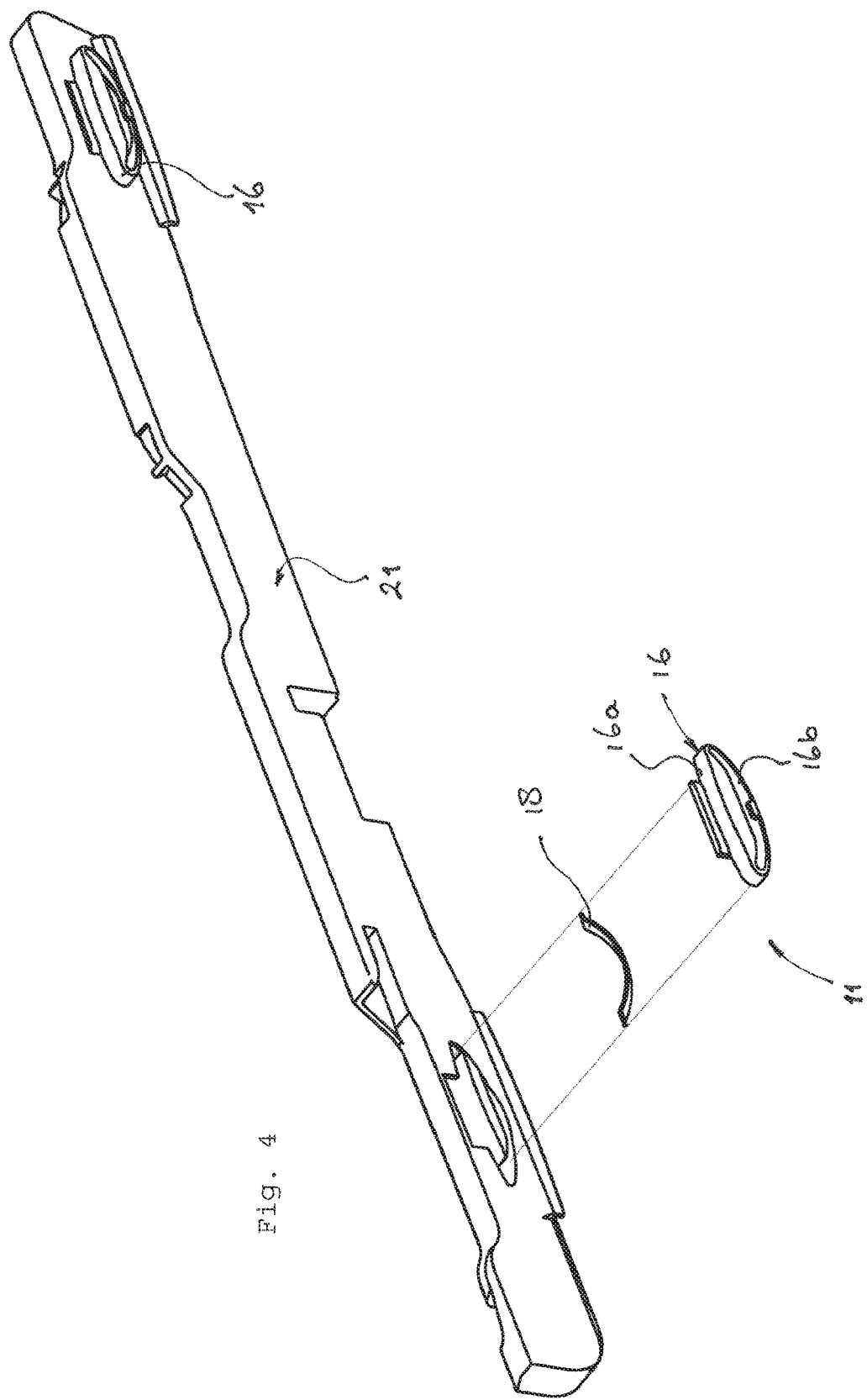

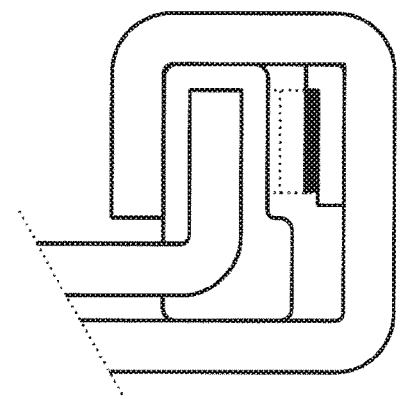
Fig. 9
Prior art
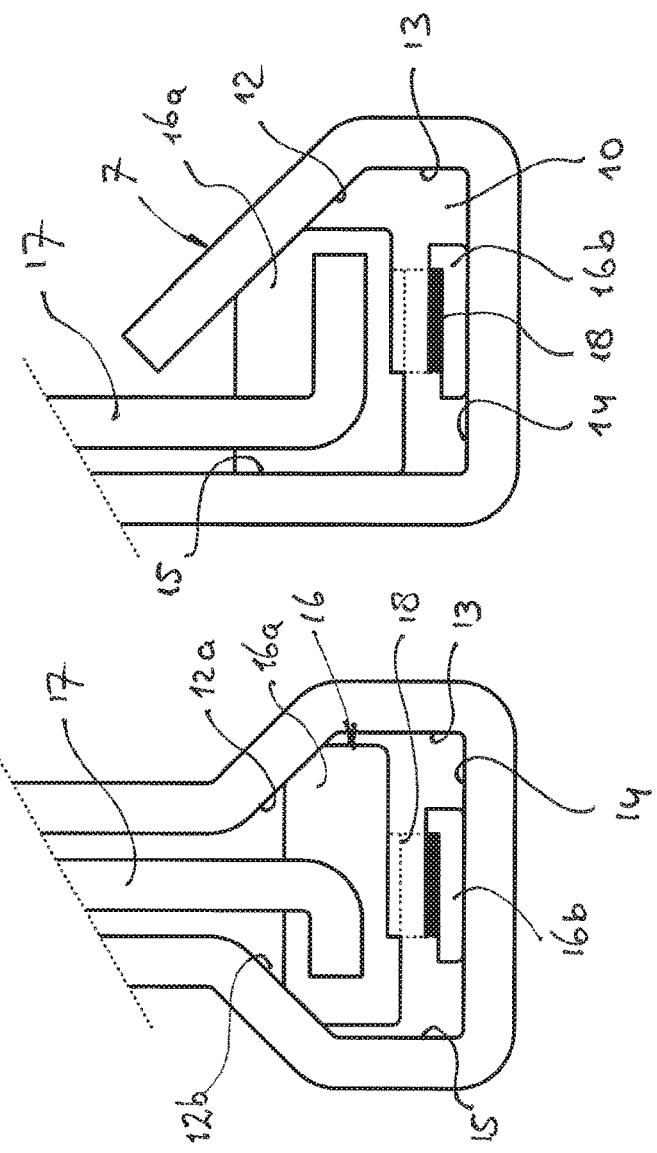
Fig. 8
Fig. 7

SLIDING SUPPORT ARRANGEMENT AND ROOF ASSEMBLY FOR A VEHICLE

BACKGROUND

The discussion below is merely provided for general background information and is not intended to be used as an aid in determining the scope of the claimed subject matter.

Aspects of the invention relate to a sliding support arrangement for supporting a slidable element in a closure of a roof assembly for a vehicle with respect to mutually orthogonal X, Y and Z directions, comprising at least a guide rail extending substantially in the X-direction, the slidable element carrying a slide shoe engaging the guide rail and supporting the slidable element at least in the Z-direction, the slide shoe including a first part fixed to the slidable element and a relatively movable second part.

In a known sliding support arrangement, as shown in FIG. 9, a slide shoe comprises a spring supporting and biasing the slide shoe in the Z-direction. A tight fit in the Y-direction should prevent rattling of the slide shoe in the guide rail in the Y-direction.

This tight fit leads to high friction forces, while wear and tear may eventually lead to rattling after a longer period of use, especially as the closure, such as roof assembly panels, become heavier and vehicles in which they are used become higher.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

An aspect of the invention is that the second part is supported by the first part mainly through a spring urging the slide shoe parts in engagement with walls of the guide rail, and wherein the spring exerts a force which is directed at a non-perpendicular (i.e. oblique or acute) angle to at least one wall of the guide rail.

Due to the non-perpendicular angle between the spring force and the at least one of the walls of the guide rail, the spring force will be resolved in Y- and Z-directions, so that dynamic vibrations occurring in Y- and Z-directions are dampened and rattling can be prevented or at least reduced by the use of only one singular spring. Of course, more springs might be used, but this is not necessary.

In one embodiment, the spring exerts a force which is directed at a non-perpendicular angle to the Y- and Z-directions. The guide rail may then comprise adjacent walls which are substantially perpendicular to each other, and preferably also to the Y- and Z-direction.

With such orientation of the spring, it is possible to use a normal guide rail, which is easier to produce.

In a convenient embodiment, the spring is a leaf spring which is accommodated in a slide shoe having a rigidly supported slide shoe part and an opposite movable or deformable slide shoe part with the spring in between.

The spring may be arranged at an angle to the Y- and Z-directions, which is an easy way to exert the desired force direction.

In another embodiment, the guide comprises at least one wall which is directed at a non-perpendicular angle to the Y- and Z-directions. This is another manner to obtain the non-perpendicular angle between the spring force and the at least one wall, also if the spring force is directed in the Z- or Y-direction.

In an embodiment, at least one upper and/or lower wall of the guide rail is at a non-perpendicular angle to the Y- and Z-directions, whereas the spring exerts a force substantially parallel to the Z-direction.

For example, two lower walls of the guide rail are at a non-perpendicular angle, e.g. of 45 degrees, to the Y- and Z-directions, whereas the spring exerts a force substantially parallel to the Z-direction.

In another embodiment, two upper walls of the guide rail are at a non-perpendicular angle, e.g. of 45 degrees, to the Y- and Z-directions, whereas the spring exerts a force substantially parallel to the Z-direction.

An aspect of the invention also includes a roof assembly for a vehicle having an opening in its fixed roof, comprising a closure element supported by at least one operating mechanism including parts that are slidably guided with respect to a guide rail through a sliding support arrangement as described above.

Further details and advantages of the invention will be described hereunder with reference to the accompanying drawings.

BRIEF DESCRIPTION OF THE DRAWINGS

FIG. 4 is a partly exploded, perspective view of a driving slide for another roof assembly comprising two sliding support arrangements.

FIGS. 7, 8 and 9 are views corresponding to that of FIG. 5a, but showing still other embodiments of the sliding support arrangement according to an embodiment of the invention and according to the prior art, respectively.

DETAILED DESCRIPTION OF THE ILLUSTRATIVE EMBODIMENTS

Figure 1:
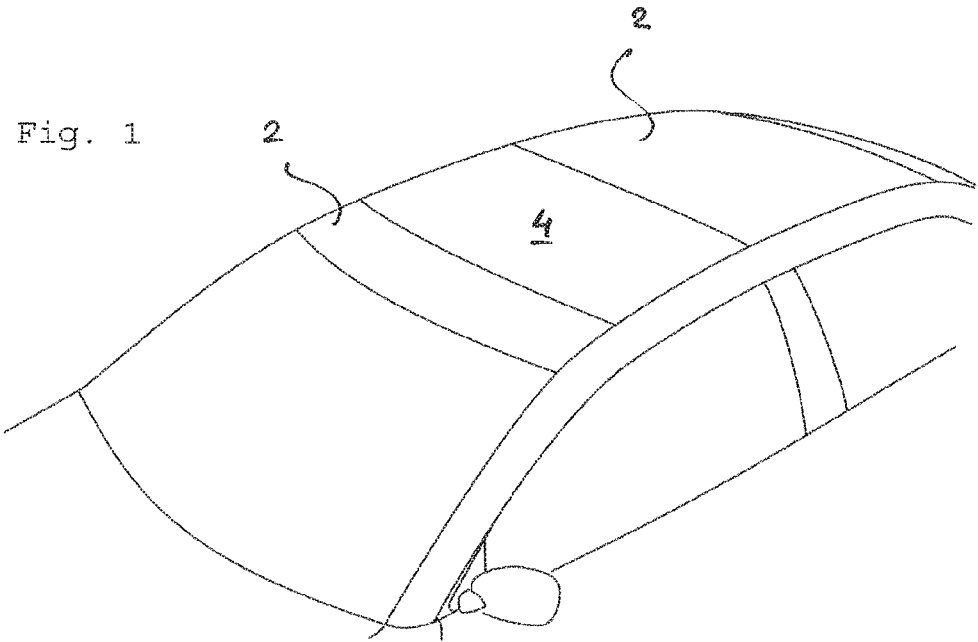
FIGS. 1 and 2 are two perspective views of a vehicle roof comprising a roof assembly, wherein the roof panel is shown in a closed and open position.
Figure 2:
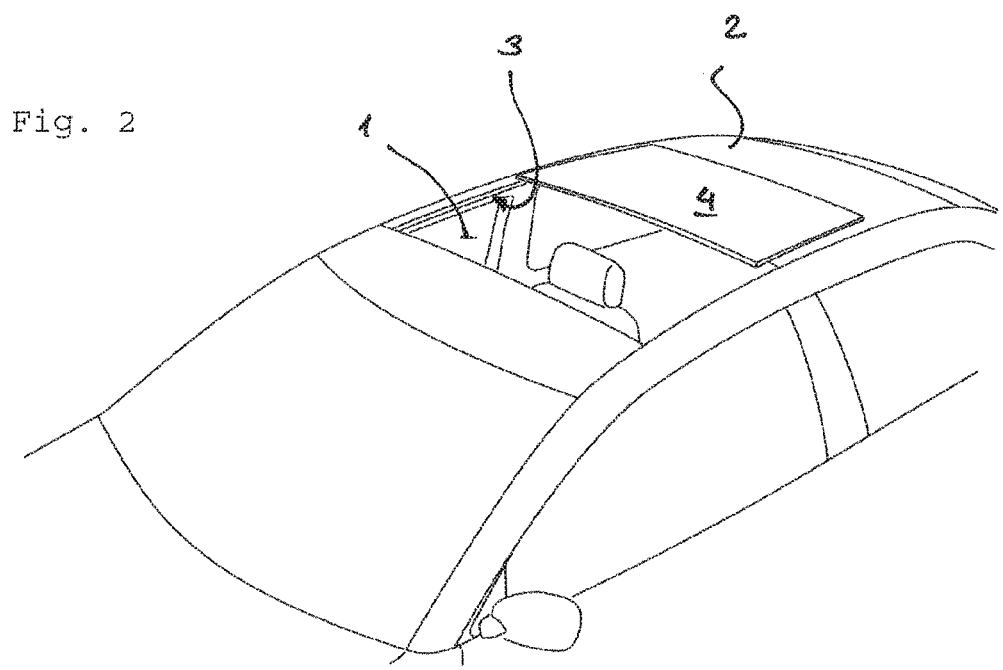

The drawings show an embodiment of a roof assembly for a vehicle, in particular a motor vehicle such as a passenger car. As is shown in FIGS. 1 and 2, this vehicle is provided with an opening 1 in its fixed roof 2, whereby it is noted that said fixed roof 2 may either form part of the vehicle or of the roof assembly itself, which in that case makes up the entire roof of the vehicle. The fixed roof 2 may consist of an integral part of the vehicle or of one or more (transparent) panels, which may be removable or form a separate adjustable roof element.

The roof assembly comprises a stationary part, such as a frame 3, and a closure element, in this case in the form of a rigid and preferably transparent panel 4, for example made of glass or of plastic material, which is movably supported by frame 3. In this embodiment, panel 4 is movable between a closed position (FIG. 1), in which roof opening 1 is closed and panel 4 is at least substantially coplanar with fixed roof 2, and an open position (FIG. 2), in which panel 4 occupies a rearward position, at least partially above fixed roof 2, in which a large part of opening 1 is cleared. In the embodiment shown, panel 4 is first tilted to a venting position in which the rear edge of panel 4 is moved upwardly, and then moved rearwardly to positions above fixed roof 2.

Figure 3:
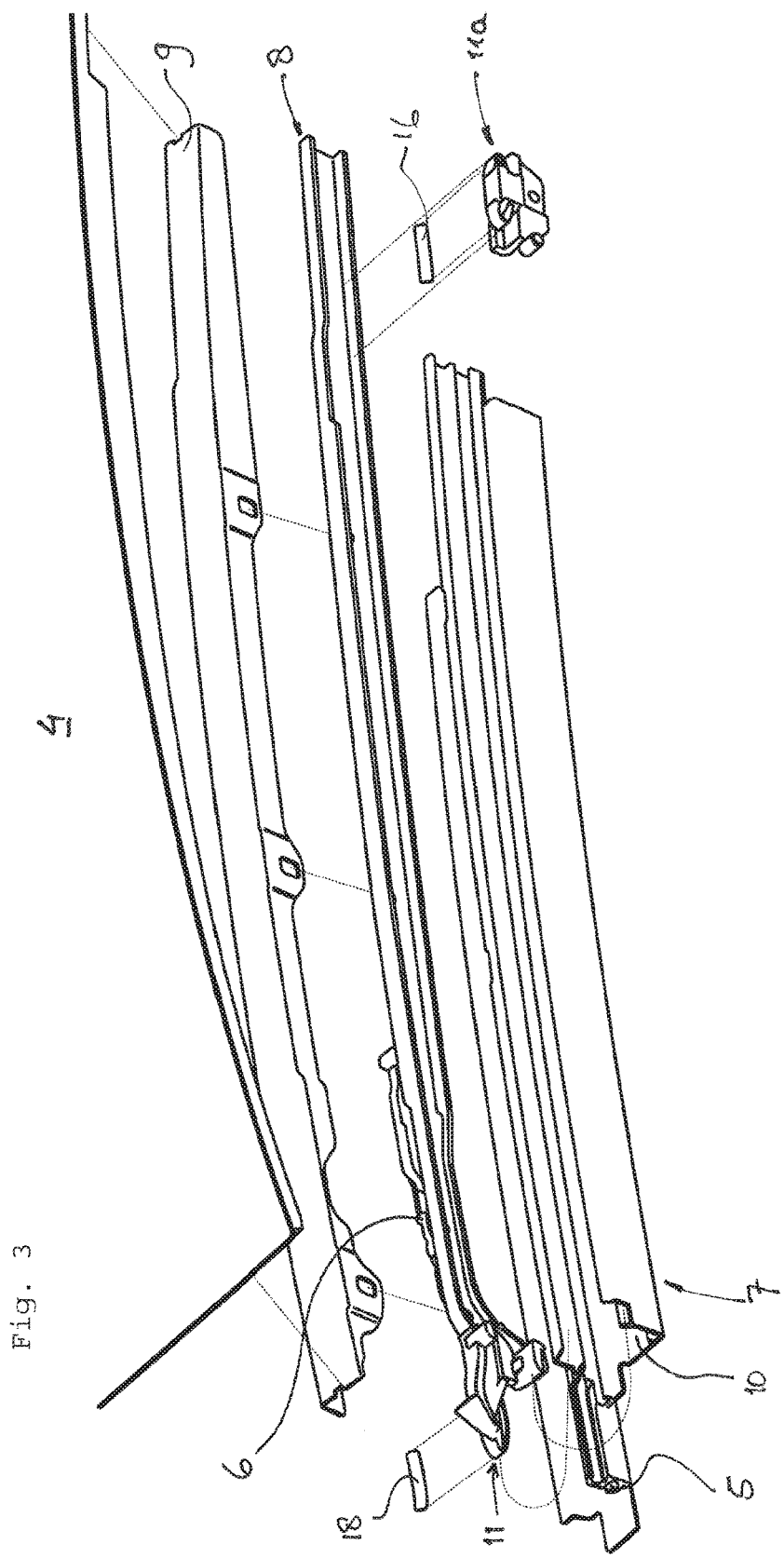
FIG. 3 is an exploded view of the main components of the operating mechanism for the roof assembly of FIG. 1 including two sliding support arrangements.

An operating mechanism is provided on each longitudinal side of panel 4 for effecting the movements of panel 4. The drawings show only the main parts on one side of the roof, but it should be kept in mind that similar parts are arranged in mirror image on the other side as well. The mechanism is driven by a drive unit including a drive element, such as a drive cable (not shown, but is represented by a cable guide 5 is shown in FIG. 3) and a manual actuator, such as a crank, or a motor such as an electric motor, for driving the cable. The operating mechanism supports panel 4 and is at least partially guided in a guide rail 7 (see FIG. 3), which forms part of or is mounted on frame 3. The guide rail 7 extends along the side edge of roof opening 1, at a lower level than fixed roof 2.

The guide rail 7 slidably receives a driving slide 6 which is engaged by the drive cable so as to adjust panel 4. For this purpose the driving slide 6 is connected, at least during a part of the movements of panel 4, to a panel support 8 which supports a panel bracket 9 of panel 4 at its front side and which is slidably guided at its front end in a guide track 10 of guide rail 7 by means of a front sliding support arrangement 11. In this case guide track 10 is in the form of a slot or groove. Further details of this operating mechanism are not relevant for the present invention, but can be found in U.S. Pat. No. 8,870,276, the contents of which are incorporated herein in its entirety.

Figure 5B:
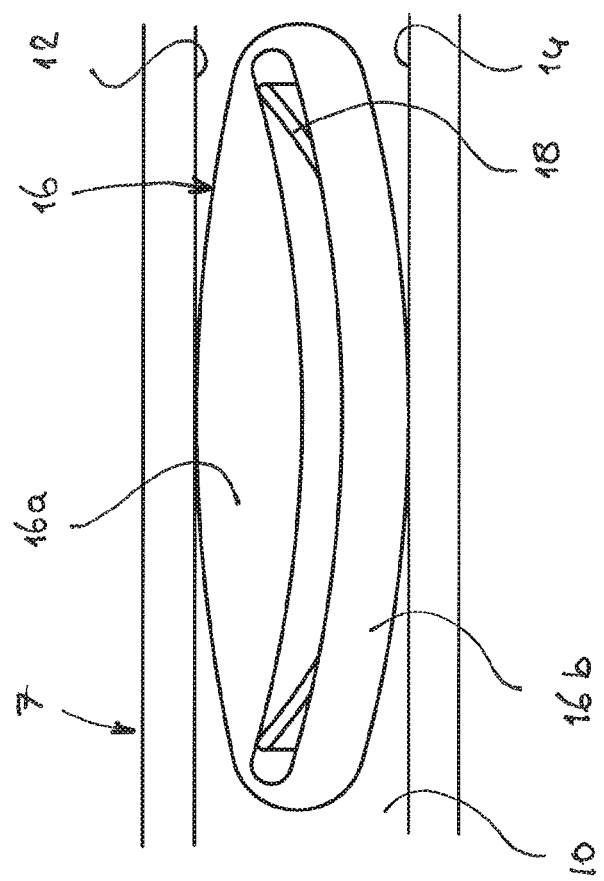
FIGS. 5a, 5b are a cross-sectional view and a view according to the lines V-V in FIG. 5a, respectively, on a larger scale.
Figure 5A:
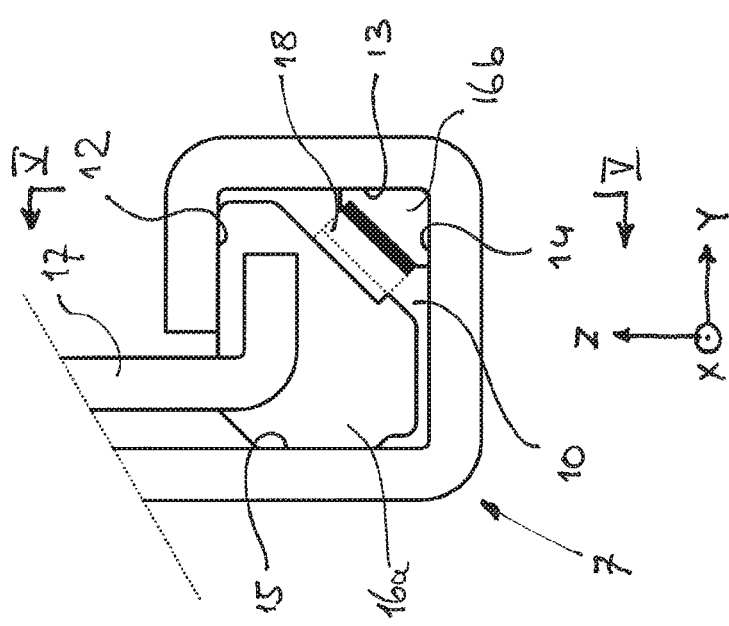

The sliding support arrangement 11 is shown in FIGS. 5a, 5b on a larger scale. The mutually orthogonal X-, Y- and Z-directions are illustrated in the drawing. The X-direction is along the longitudinal axis of a vehicle in a driving direction, Z-direction is perpendicular to X and parallel to a vertical axis through the vehicle, Y-direction is perpendicular to the longitudinal axis in a transverse direction in a horizontal plane. It should be noted that the guide rails 7 may be slightly curved, or might be slightly non-parallel with respect to each other so that the expression parallel and perpendicular include slight deviations therefrom.

Guide track 10 of guide rail 7 is shown in a simple way here. It includes 4 perpendicular walls 12, 13, 14 and 15 extending longitudinally parallel to the X-direction and being perpendicular to the Y- and Z-directions. The sliding support arrangement includes a slide shoe 16 having a more rigid part 16a attached to a support bracket 17 of panel support 8 and a more flexible part 16b. As is shown in FIG. 5b, the parts are elongated in the X-direction and are connected to each other at their ends in the longitudinal direction, such that part 16b can move relative to part 16a at least in the central portion of the slide shoe 16. Part 16b could also be more rigid like part 16a, and being movably connected to part 16a.

Between parts 16a and 16b of slide shoe 16 there is arranged a spring 18, in this case a leaf spring which is curved in the longitudinal direction of the slide shoe 16, wherein the curvature is concave such that the ends of spring 18 rest against rigid part 16a and a central part supports part 16b of slide shoe 16. Other spring types or shapes are conceivable. The spring 18 is positioned at an angle of in this case 45 degrees with respect to the Y- and Z-direction, so that it exerts a force which is also angled in this direction. The vertical support of the front panel support 8 is mainly facilitated by spring 18. Due to the spring force of spring 18, part 16a of slide shoe 16 is urged against walls 12, 15 of guide track 10 and part 16b against walls 13, 14, so that slide shoe 16 is well positioned within guide track 10 of guide rail 7 in both Y- and Z-directions without any rattling noises, also in the long run. This is obtained with the use of one spring 18 with a single spring element only, and without the necessity of a tight fit, which could lead to high friction forces. Between slide shoe part 16a and walls 13, 14 there is some play, but in practice it may be kept small to prevent a large movement of panel 4 if excessive vibrations occur in panel 4. The force of spring 18 is chosen such that it will keep slide shoe parts 16a, 16b in engagement with their walls 12, 15 and 13, 14, respectively. Only in extraordinary situations with excessive vibrations, they might lose contact.

The slide shoe 16 can be made in one piece. If different properties of parts 16a, 16b are desired, then for example insert molding with two or more materials may be used. On the other hand, slide shoe 16 might also have a structure including two or more pieces. Slide shoe parts 16a, 16b each has at least two sliding surfaces lying flat against the co-operating (adjacent) walls of guide track 10 of guide rail 7. Slide shoe parts 16a, 16b, on their sides facing each other, are shaped so as to hold spring 18 in position with respect to slide shoe 16. These sides may have recesses, ridges or the like to hold spring 18 in position.

FIG. 3 shows that the sliding support arrangement 11a can be used in other positions of the operating mechanism as well, here in a rear support 19 of panel including a slide shoe 16 that can slide in a guide rail 20 in panel support 8.

FIG. 4 shows another use of the sliding support arrangement, in this case in a driving slide 21 as used in the operating mechanism that is disclosed in U.S. Pat. No. 7,828,376, the contents of which are incorporated herein in its entirety. The sliding support arrangement 11 of the driving slide 21 includes two slide shoes 16 and may be of the same structure as that of FIGS. 5a, 5b.

FIGS. 6-8 show other variations of the sliding support arrangement 11.

Figure 6B:
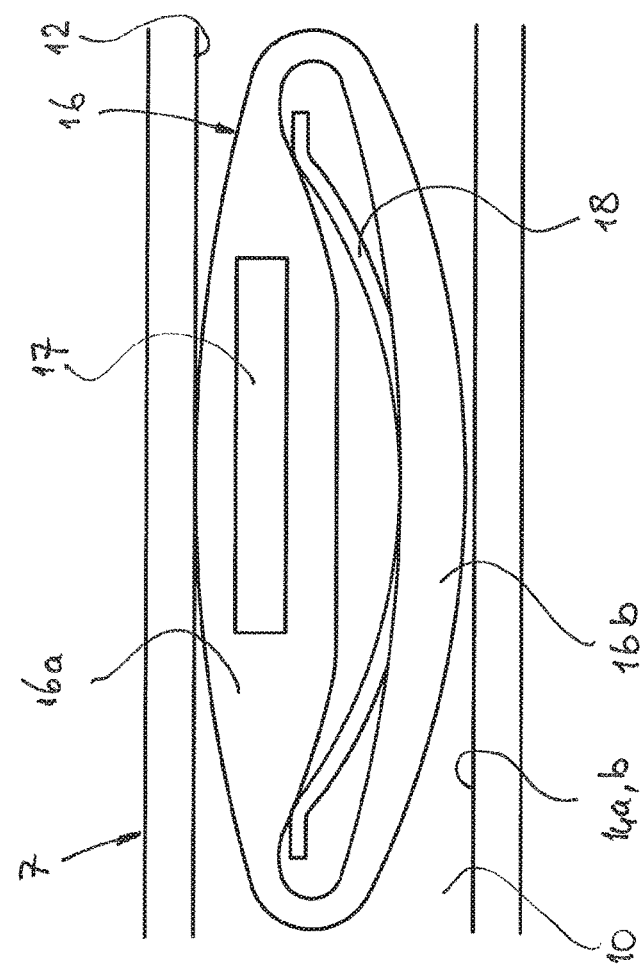
FIGS. 6a, 6b are views corresponding to those of FIGS. 5a, 5b but showing a different embodiment of the sliding support arrangement.
Figure 6A:
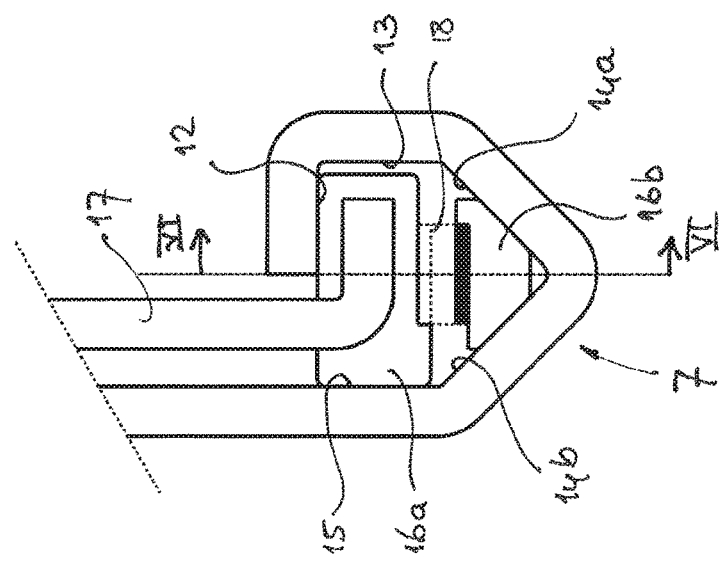

In the embodiment of FIGS. 6a, 6b, the guide track 10 of guide rail 7 is shaped differently with two inclined lower walls 14a, 14b and three other walls 12, 13, 15 perpendicular to the Y- and Z-direction. The lower walls 14a, 14b are inclined symmetrically at 45 degrees, but other angles are conceivable of course. In this case, the spring 18 is oriented such that the spring forces are directed parallel to the Z-direction. However, due to the inclination of the two lower walls 14a, 14b, the slide shoe 16 is firmly seated in both Y- and Z-directions, despite the fact that spring 18 is positioned in a normal orientation.

In the variation of FIG. 7 embodiment, the guide track of guide rail 7 again has 5 walls, but now two inclined upper walls 12a, 12b and three other walls 13, 14, 15 perpendicular to the Y- and Z-directions.

The variation of FIG. 8 shows an asymmetrical wall arrangement with one upper wall 12 inclined (at 45 degrees) and the other three walls 13, 14, 15 perpendicular to the Y- and Z-directions. The spring 18 is positioned so as to exert a force substantially parallel to the Z-direction. This force in Z-direction is resolved by inclined wall 12 into the Y- and Z-directions.

It is of course possible to position both the spring and one or more walls of the guide track 10 in guide rail 7 in an inclined orientation, but in view of production cost a simple embodiment having walls perpendicular to Y- and Z-directions is best. For example, guide rails are often curved around a Y-axis and it is then easier to keep perpendicular walls under control than inclined walls which might wobble. The embodiment of FIG. 5 has the advantage that a normal guide rail can be used, so that only slide shoe 16 is adapted to obtain the desired object.

From the above it will be clear that the invention provides a sliding support arrangement which leads to desired sliding properties: no rattling in any direction, also after a long period of use, and a low sliding friction.

The invention is not limited to the embodiments described above which may be varied widely within the scope of the invention as defined by the appending claims. Also other types of roof assemblies may use the sliding support arrangements, such as folding roofs, slatted roofs and the like.

The invention claimed is:

1. A sliding support arrangement in a closure of a roof assembly for a vehicle with respect to mutually orthogonal X, Y and Z directions, the roof assembly comprising at least a guide rail extending substantially in the X-direction and a slidable element movable relative to the guide rail, the sliding support arrangement comprising: a slide shoe engaging the guide rail and supporting the slidable element at least in the Z-direction, the slide shoe including a first part fixed to the slidable element and a relatively movable second part, the second part being supported by the first part at least in part through a spring urging the slide shoe parts in engagement with walls of the guide rail, and wherein the spring exerts a force which is directed at an oblique angle to at least one of said walls of the guide rail.

2. The sliding support arrangement according to claim 1, wherein the spring exerts a force which is directed at the oblique angle to the Y- and Z-directions.

3. The sliding support arrangement according to claim 1, wherein the guide rail comprises adjacent walls which are substantially perpendicular to each other.

4. The sliding support arrangement according to claim 2, wherein the spring is a leaf spring which is accommodated in the slide shoe in which the first part is rigidly supported and the second part is opposite and movable or deformable with the spring in between.

5. The sliding support arrangement according to claim 2, wherein the spring is arranged at an angle to the Y- and Z-directions.

6. The sliding support arrangement according to claim 1, wherein the guide rail comprises at least one wall which is directed at an oblique angle to the Y- and Z-directions.

7. The sliding support arrangement according to claim 6, wherein two lower walls of the guide rail are at an oblique angle to the Y- and Z-directions, whereas the spring exerts a force substantially parallel to the Z-direction.

8. The sliding support arrangement according to claim 6, wherein two upper walls of the guide rail are at an oblique angle to the Y- and Z-directions, whereas the spring exerts a force substantially parallel to the Z-direction.

9. The sliding support arrangement according to claim 6, wherein one upper wall of the guide rail is at an oblique angle to the Y- and Z-directions, whereas the spring exerts a force substantially parallel to the Z-direction.

10. A sliding support arrangement in a closure of a roof assembly for a vehicle with respect to mutually orthogonal X, Y and Z directions, the roof assembly comprising at least a guide rail extending substantially in the X-direction and a slidable element movable relative to the guide rail, the sliding support arrangement comprising a slide shoe engaging the guide rail and supporting the slidable element at least in the Z-direction, the slide shoe including two relatively movable parts connected to each other through at least a spring urging the slide shoe parts in engagement with the guide rail, wherein the spring exerts a force which is directed at an angle to the Y- and Z-directions, and wherein the spring is accommodated in the slide shoe in which a first part is rigidly supported and a second part is opposite and movable or deformable with the spring in between.

11. A sliding support arrangement in a closure of a roof assembly for a vehicle with respect to mutually orthogonal X, Y and Z directions, the roof assembly comprising at least a guide rail extending substantially in the X-direction and a slidable element movable relative to the guide rail, the sliding support arrangement comprising a slide shoe engaging the guide rail and supporting the slidable element at least in the Z-direction, the slide shoe including a first part fixed to the slidable element and a relatively movable second part, the second part being supported by the first part at least in part through a spring urging the slide shoe parts in engagement with walls of the guide rail, wherein at least two adjacent walls of the guide rail are at an angle to the Z-direction, and wherein the spring exerts a force which is directed at an oblique angle to both said walls of the guide rail.

12. A roof assembly for a vehicle having an opening in its fixed roof, comprising a guide rail, a closure element supported by at least one operating mechanism including at least one slidable element that is slidably guided with respect to the guide rail through a sliding support arrangement with respect to mutually orthogonal X, Y and Z directions, the sliding support arrangement comprising a slide shoe engaging the guide rail and supporting the slidable element at least in the Z-direction, the slide shoe including a first part fixed to the slidable element and a relatively movable second part, the second part being supported by the first part at least in part through a spring urging the slide shoe parts in engagement with walls of the guide rail, and wherein the spring exerts a force which is directed at an acute angle towards at least one of said walls the guide rail.

13. The sliding support arrangement according to claim 12, wherein the spring is a leaf spring.

14. The sliding support arrangement according to claim 12, wherein the spring is accommodated in the slide shoe in which the first part is rigidly supported and the second part is opposite and movable or deformable with the spring in between.

15. The sliding support arrangement according to claim 10, wherein the spring is a leaf spring.

16. The sliding support arrangement according to claim 11, wherein the spring is a leaf spring.

17. The sliding support arrangement according to claim 11, wherein the spring is accommodated in the slide shoe in which the first part is rigidly supported and the second part is opposite and movable or deformable with the spring in between.

18. The sliding support arrangement according to claim 1, wherein the spring is a leaf spring.

19. The sliding support arrangement according to claim 1, wherein the spring is accommodated in the slide shoe in which the first part is rigidly supported and the second part is opposite and movable or deformable with the spring in between.

* * * * *